(12) United States Patent  
Ramshaw

(10) Patent No.: US 7,710,417 B2
(45) Date of Patent: May 4, 2010

(54) SPATIAL BINNING OF PARTICLES ON A GPU

(75) Inventor: Cliff Ramshaw, Derbyshire (GB)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 11/623,230

(22) Filed: Jan. 15, 2007

(65) Prior Publication Data

US 2008/0170079 A1 Jul. 17, 2008

(51) Int. Cl.
*G06T 15/00* (2006.01)

(52) U.S. Cl. .................. 345/422; 345/473; 345/475; 703/2; 703/6; 703/9

(58) Field of Classification Search ............... 345/422, 345/473, 474, 475; 703/2, 6, 9
See application file for complete search history.

(56) References Cited

U.S. PATENT DOCUMENTS

| 7,120,311 | B2 | 10/2006 | Snyder |
| 7,349,832 | B2 * | 3/2008 | Anderson ............... 703/9 |
| 2003/0011609 | A1 | 1/2003 | Deering et al. |
| 2004/0203928 | A1 | 10/2004 | Nevin et al. |
| 2004/0217956 | A1 | 11/2004 | Besl et al. |
| 2005/0093876 | A1 | 5/2005 | Snyder et al. |
| 2006/0106591 | A1 | 5/2006 | Bordes et al. |
| 2006/0176303 | A1 | 8/2006 | Fairclough |

FOREIGN PATENT DOCUMENTS

WO  WO2006109011  10/2006

OTHER PUBLICATIONS

Amada, et al., "Particle-Based Fluid Simulation on GPU", available at least as early as Dec 18, 2006, pp. 1-2.

Chisu, "Techniques for Accelerating Intensity-based Rigid Image Registration", available at least as early as Dec. 18, 2006, at <<http://campar.in.tum.de/twiki/pub/Main/WolfgangWein/DA-Chisu.pdf>>, pp. 1-106.

Chun, et al., "Public Information Disclosure", available at least as early as Dec. 18, 2006, at <<http://www.actuality-systems.com/site/content/pdf/ASI-0110_DISCLOSURE_SpatialGL_Rendering_Pipeline.pdf>> pp. 1-15.

Hielte, "Smoothed Particle Hydrodynamics on the Cell Broadband Engine", available at least as early as Dec. 18, 2006, pp. 1-56.

Holmlund, et al., "Simulation and Rendering of a Viscous Fluid using Smoothed Particle Hydrodynamics", available at least as early as Dec. 18, 2006, at <<http://www.cs.umu.se/education/examina/Rapporter/MarcusVesterlund.pdf>>, pp. 1-45.

(Continued)

*Primary Examiner*—Phu Nguyen
(74) *Attorney, Agent, or Firm*—Lee & Hayes, PLLC

(57) ABSTRACT

A method of performing spatial binning of particles is described which can be performed on a graphics processing unit. A stencil buffer is primed with a pattern which controls the writing of data to a framebuffer. A first shader is used to calculate the co-ordinates of the bin in which a particle is located and a second shader is used to write the particle's ID to a location representative of that bin in the framebuffer. The pattern in the stencil buffer ensures that particle data within a bin is not overwritten and the stencil buffer also maintains a record of the number of entries within each bin.

12 Claims, 12 Drawing Sheets

OTHER PUBLICATIONS

Kelager, "Lagrangian Fluid Dynamics Using Smoothed Particle Hydrodynamics", available at least as early as Dec. 18, 2006, pp. 1-88.

Kolb, et al., "Dynamic Particle Coupling for GPU-based Fluid Simulation", available at least as early as Dec. 18, 2006, pp. 1-6.

Muller, et al., "Particle-Based Fluid Simulation for Interactive Applications", available at least as early as Dec. 18, 2006, The Eurographics Association, 2003, pp. 1-7.

* cited by examiner

SPATIAL BINNING OF PARTICLES ON A GPU

BACKGROUND

In order to make computer generated graphics look more realistic, advanced particle simulation may be used to model the behavior of particles, for example using Smoothed Particle Hydrodynamics (SPH) to model the flow of liquids. In order to solve SPH, and many other simulations, it is necessary to iterate over all particles in the simulation and for each particle, to find all other particles within a specified distance (the support radius, h) of that particle. This process is known as a 'nearest neighbor search'. Solution of SPH then involves iterating over all the nearest neighbors of each particle and summing density and interaction forces between them as an approximation to a set of integrals.

The simulation may involve tens of thousands of particles (e.g. 20,000 particles) and therefore the nearest neighbor search is computationally intensive. Where the graphics are being generated for use in a film or television program, these calculations do not need to be carried out in real time or close to real time. However, for computer games it is necessary to perform these calculations in a short time interval to provide substantially real time updates (typically 30 simulations a second or faster).

In order to simplify the nearest neighbor search, the search may be performed in two passes. First a broad phase allocates particles 101 to bins 102, as shown in a simple 2D example in FIG. 1. If the length of each side of a bin is h (the support radius), then when performing a nearest neighbor search, only those particles in the same bin and neighboring bins (e.g. 9 bins in total for a 2D example, 27 bins for a 3D example) need to be considered. As two particles in neighboring bins may be further apart than the support radius (e.g. particles 103 and 104), a second phase, known as the narrow phase, calculates the distance between the particle being considered and particles in the neighboring bins and discards those where their separation is greater than the support radius.

The hardware on which such calculations must be performed (i.e. PCs and games consoles) often comprise both a central processing unit (CPU) and a graphics processing unit (GPU). Whilst the CPU is designed to have general processing capability, the GPU has a highly parallel structure and is designed specifically to perform graphics operations, including rendering polygons and texture mapping. Recent GPUs include programmable stages known as shaders: a vertex shader and a pixel shader. The vertex shader is used to modify the vertices of a polygon, e.g. moving a vertex to change the shape of an object. The pixel (or fragment) shader is used to change the appearance of a pixel (i.e. its color) based on parameters such as lighting, shading etc. By performing the graphics operations in dedicated hardware (i.e. the GPU) rather than in the CPU, the operations can be performed much more quickly. However, as the GPU is not designed for general use, it is not flexible like the CPU and has a number of limitations, including that it has little or no ability to perform scattered write operations (i.e. writing of data to random or scattered memory locations). A severe limitation of the GPU is that data written by the GPU is not generally immediately available to be read back due to a separation between input and output structures.

In order to speed up the nearest neighbor search, techniques have been proposed to enable some of the operations to be performed on the GPU to leverage its parallel processing capability. In an example, the CPU may be used to sort the data whilst the GPU uses the results to perform the simulation itself. However, the passing of data between the CPU and the GPU is prone to latency issues, with the GPU being left idle whilst the CPU completes the sort and also bottlenecks may arise as data is transferred between the CPU and GPU.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of performing spatial binning of particles is described which can be performed on a graphics processing unit. A stencil buffer is primed with a pattern which controls the writing of data to a framebuffer. A first shader is used to calculate the co-ordinates of the bin in which a particle is located and a second shader is used to write the particle's ID to a location representative of that bin in the framebuffer. The pattern in the stencil buffer ensures that particle data within a bin is not overwritten and the stencil buffer also maintains a record of the number of entries within each bin.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

An Exemplary Method

Figure 1:
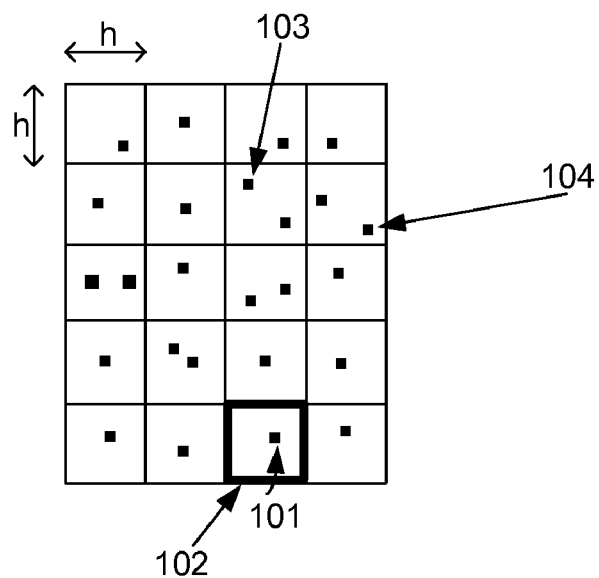
FIG. 1 shows a schematic diagram of a grid allocating particles to bins.
Figure 2:
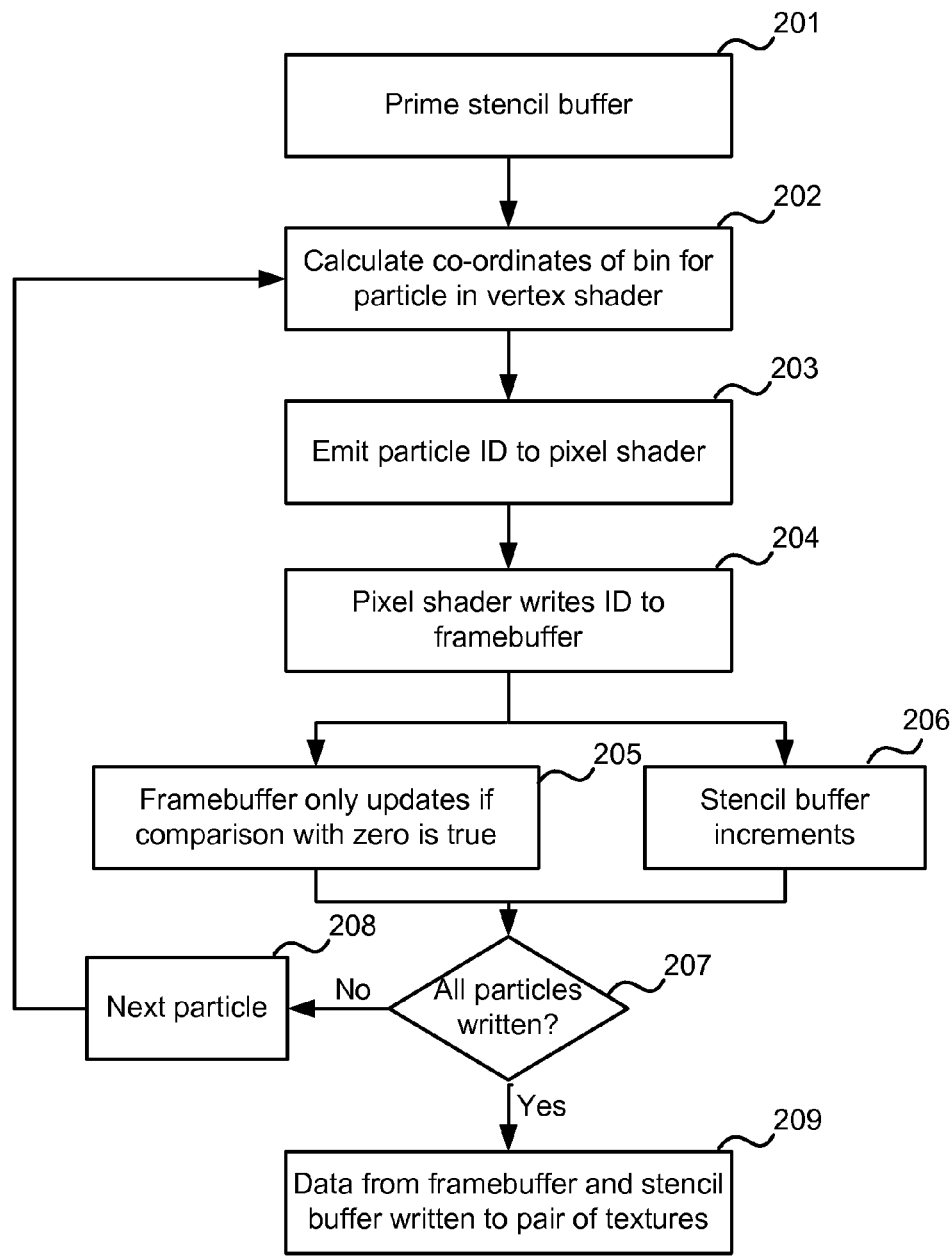
FIG. 2 shows an example flow diagram of a method of spatial binning of particles which can be implemented on a GPU.

FIG. 2 shows an example flow diagram of a method of spatial binning of particles which can be implemented on a GPU and this can be described with reference to FIG. 3 which shows a graphical representation of the spatial binning process. A simplified block diagram of a GPU is shown in FIG. 4. It will be appreciated that only elements of the GPU 400 which are required for explanation purposes are shown in FIG. 4 and a GPU may contain additional functional elements.

To perform spatial binning in three dimensional (3D) space, the 3D volume 300 is divided into a number of bins 301. To represent these in two dimensions (2D), because the GPU operates in 2D texture space, the volume may be divided into slices 302 and these represented by placing them side by side 303. In the example shown, the 3D volume 300 is divided into 27 bins, 9 bins per slice 302, which may be represented in a 3×9 grid 303.

Whilst the size of each bin in space is determined by the support radius, h, of each particle, in texture space (i.e. in the memory within the GPU) the size of the bin is W×H (the width and height of each bin) and this determines the number of particles that can be grouped in a single bin, (W×H−1). In the example shown in FIG. 3, both W and H are equal to four, therefore allowing a maximum of 15 particles per bin. For optimum performance the bin size, and hence the two parameters W and H, should be as small as possible without overflowing the bins. This minimizes the amount of memory used and also reduces overall processing effort because firstly, at the bin filling stage each particle is rendered as a quadrilateral of dimensions W×H and the bigger this area, the more time it takes to draw a particle and secondly, processing effort is not wasted reading "empty" cells within the bins. The hardware may provide an upper limit on the size of the bin (i.e. the product of W and H) e.g. 256 for current hardware. The effect of overflowing a bin is described below and if overflowing does occur, the bin size may be adjusted accordingly.

In the example shown, the binning process starts by priming the stencil buffer 401 (block 201). The stencil buffer is primed such that each of the W×H entries in a bin contains a monotonically decreasing integer, starting with zero in the top left corner. In the example shown in FIG. 3, each bin will be primed with the following entries:

$$\begin{pmatrix} 0 & 15 & 14 & 13 \\ 12 & 11 & 10 & 9 \\ 8 & 7 & 6 & 5 \\ 4 & 3 & 2 & 1 \end{pmatrix}$$

This pattern is tiled across the stencil buffer so that each bin contains the same entries and the stencil buffer is used in "wrap" mode such that the value 15 is considered 1 less than zero.

In an example, the priming of the stencil buffer may be performed by aliasing the stencil buffer memory with a render target so that the pattern can be written with a simple pixel shader that applies a tiling texture that has been pre-initialized with the monotonically decreasing integers as described above. This technique may be implemented, for example, on an Xbox360 (trade mark) games console.

Figure 3:
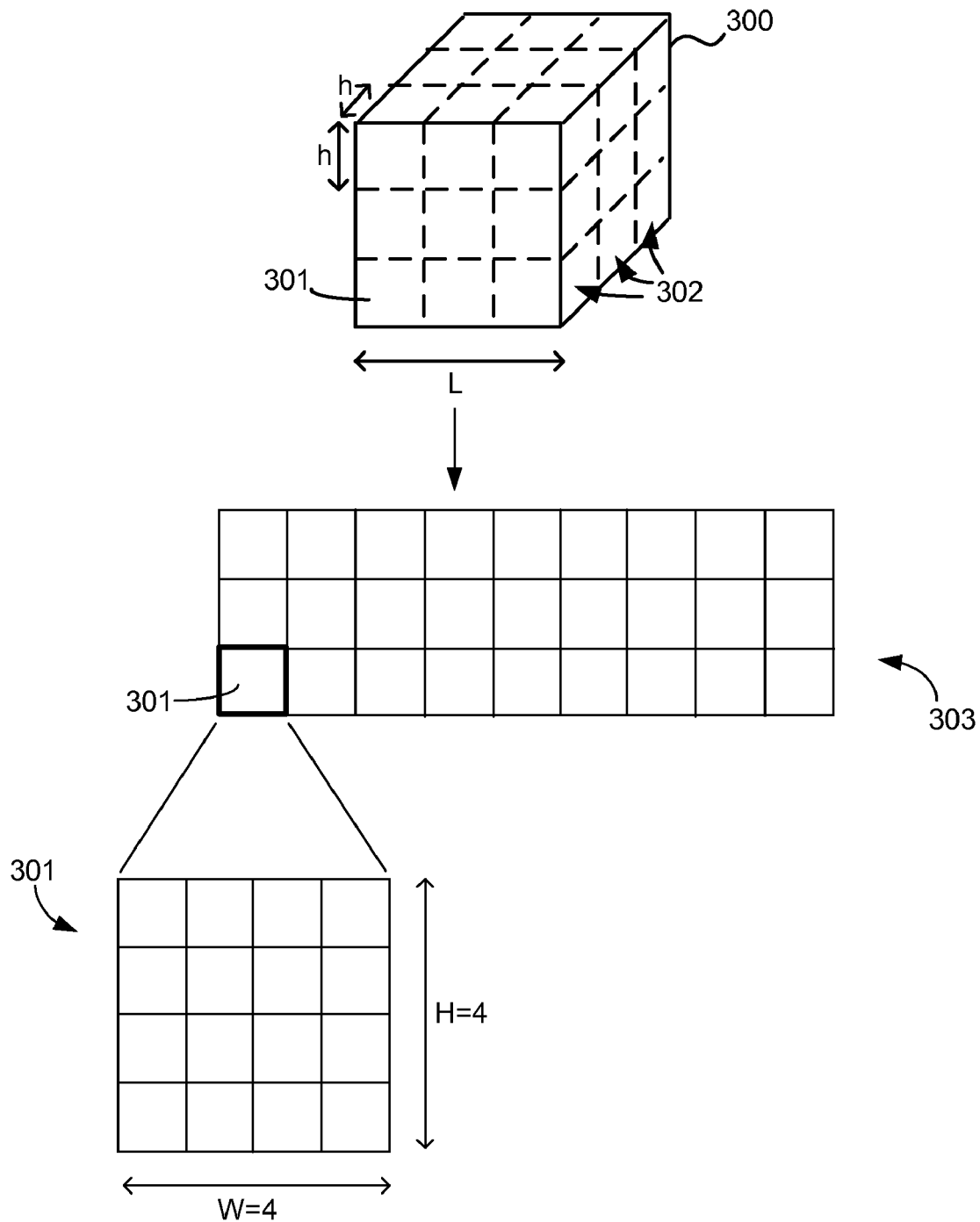
FIG. 3 shows a graphical representation of the spatial binning process.
Figure 4:
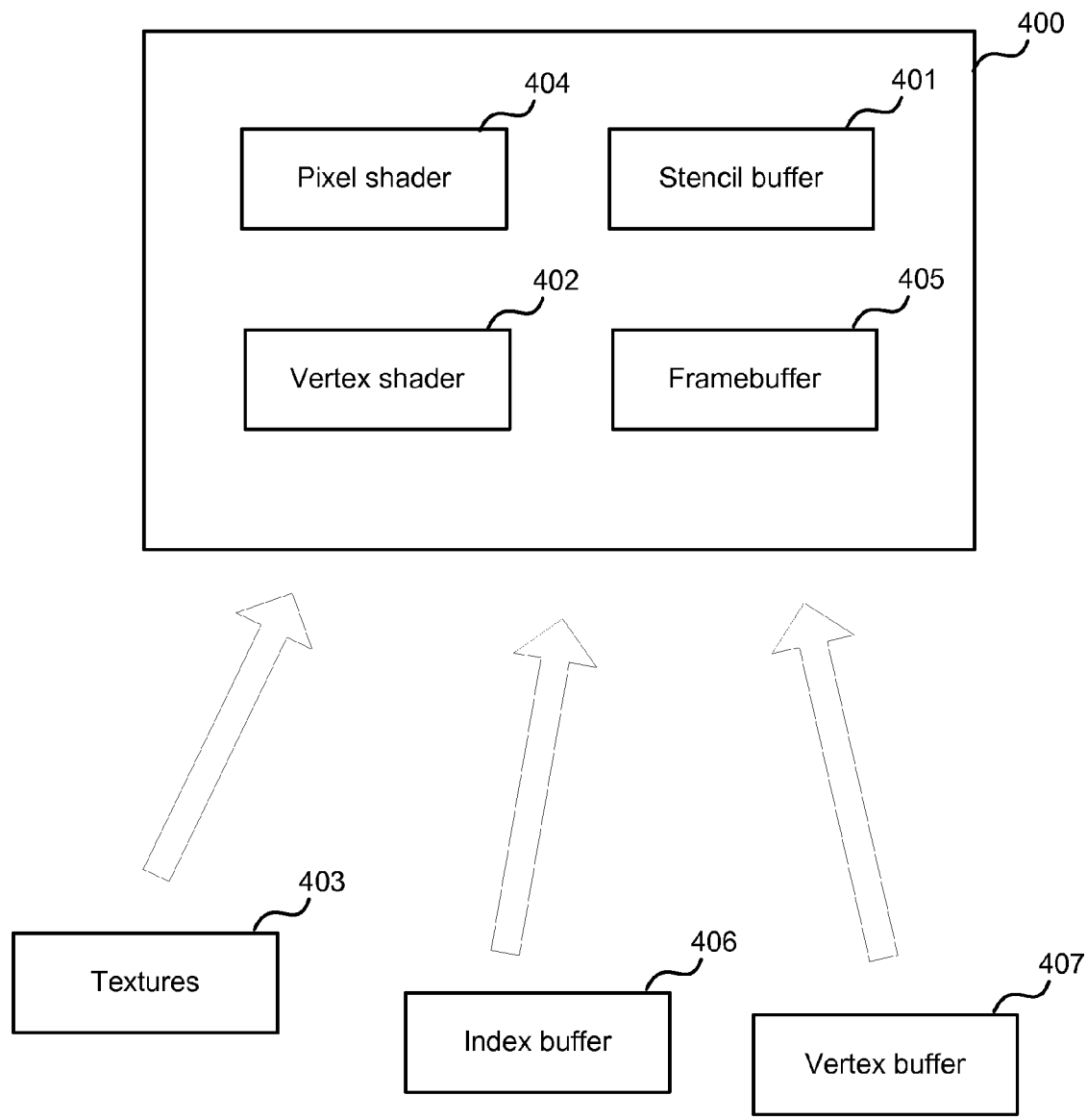
FIG. 4 shows a block diagram of a GPU.

The vertex shader 402 then calculates the co-ordinates of a quadrilateral in texture (or screen) space for a first particle (block 202). This calculation is based on a mapping between n-dimensional space (e.g. 3D) and 2D space. The mapping may include a quantization function (e.g. 'floor', which rounds down to the nearest integer or 'ceil', which rounds up to the nearest integer). The co-ordinates of the particles in the n-dimensional simulation space (e.g. within the volume 300) may be stored in and read from the vertex buffer 407 or a texture 403. As shown in FIG. 4, the vertex buffer 407, the textures 403 and the index buffer 406 do not reside on the GPU but in main memory and are fetched piecemeal into the GPU on demand via small caches (as indicated by the arrows in FIG. 4). An example mapping between x,y,z in 3D (simulation) space 300 and u,v in the 2D texture space 303 which calculates the co-ordinates of the top left corner of each quadrilateral is:

$$u = (\text{floor}(x/h) \times W) + (E \times \text{floor}(z/h) \times W)$$

$$v = (\text{floor}(y/h) \times H)$$

where L is the length of the volume on a side over which the simulation is to take place (as shown in FIG. 3) and E is the number of bins along each axis in the simulation space, which may be calculated by dividing the length, L, by the support radius, h, and rounding up to the nearest integer (i.e. E=ceil (L/h)). The co-ordinates of the bottom right corner of the quadrilateral can be calculated by:

$$u' = u + W$$

$$v' v + H$$

Having calculated these co-ordinates, the vertex shader emits the particle ID to a pixel shader 404 (block 203) which subsequently writes the ID out to the framebuffer 405 (block 204). The framebuffer memory is, to a large extent, configurable, so it can be divided up into as many as four render targets of varying formats (referring to the kind of data stored), but of the same dimensions, subject to the constraint that the total memory available for all render targets is restricted. In this example, only a single render target is used but use of additional render targets is described below with reference to FIG. 6. The framebuffer 405 is set to a format with sufficient precision to accurately record the ID, e.g. to store IDs, numbers between 0 and the maximum number of particles need to be represented with sufficient precision, whilst in the case described below, where positions are also stored, a triple of numbers (x,y,z coordinates) need to be stored with sufficient precision to keep the simulation accurate. The framebuffer has the same number of entries (W×H entries per bin) as the stencil buffer and whilst the particle ID is written to each entry in the particular bin, the framebuffer is set to update only if the result of comparison of zero with the corresponding value in the stencil buffer is true (block 205). The stencil buffer therefore acts as a mask to control the address to which the particle ID is written. Substantially simultaneously with the update of the framebuffer, all the stencil buffer values for the particular bin are incremented by one (block 206), irrespective of the result of the comparison (also referred to as the 'stencil test' or 'stencil comparison'). The updating of the values in the framebuffer and the stencil buffer (blocks 205-206) may be performed by the portion of the GPU hardware which controls the stencil buffer. This process is repeated for each of the particles in the simulation (blocks 202-208) until all the particles have been allocated to a bin and their IDs written to the framebuffer (giving a 'yes' at block 207). At this point, the framebuffer contains, for each bin, a set of indices representing all the particles located at that bin, stored in row-column order from the top-left pixel of the bin to the right and down. The data from the frame and stencil buffers 405, 401 may then be written to a pair of textures 403 (block 209) e.g. one texture, I, for the information from the framebuffer (i.e. the particle IDs) and a second texture, C, for the information from the stencil buffer. The data in the stencil buffer is useful data because the value in the top left corner of each bin records the total number of entries in that bin (also referred to as the 'bin count'). An example of this method in operation is described below.

Use of the method above in which a pattern is tiled across the stencil buffer and then portions of it updated after each particle has been written allows the GPU to be immediately aware of the results it has written which otherwise is not possible (as described above). The methods described herein enable performance of 49 or more simulations a second for 21,000 particles which is a significant increase over other known techniques.

Considering the example shown in FIG. 3, the contents of the stencil buffer when primed (following block 201) can be represented by the following matrix, where for purposes of explanation only four bins are shown (each group of 4×4 elements corresponding to a bin):

$$\begin{pmatrix} 0 & 15 & 14 & 13 & 0 & 15 & 14 & 13 & 0 & 15 & 14 & 13 & 0 & 15 & 14 & 13 \\ 12 & 11 & 10 & 9 & 12 & 11 & 10 & 9 & 12 & 11 & 10 & 9 & 12 & 11 & 10 & 9 \\ 8 & 7 & 6 & 5 & 8 & 7 & 6 & 5 & 8 & 7 & 6 & 5 & 8 & 7 & 6 & 5 \\ 4 & 3 & 2 & 1 & 4 & 3 & 2 & 1 & 4 & 3 & 2 & 1 & 4 & 3 & 2 & 1 \end{pmatrix}$$

If the first pixel, ID=1, is allocated to the first bin (in block 202), the framebuffer will be updated as the ID is written to each element for the first bin (block 204), i.e., the value '1' is written to each of the entries in the first four columns of the framebuffer. However, the value in the framebuffer is only updated where the comparison with zero is true (block 205) giving the resultant framebuffer contents as shown by the matrix below, where again for purposes of explanation only four bins are shown:

$$\begin{pmatrix} 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

The stencil buffer is also updated by one (block 206) to give:

$$\begin{pmatrix} 1 & 0 & 15 & 14 & 0 & 15 & 14 & 13 & 0 & 15 & 14 & 13 & 0 & 15 & 14 & 13 \\ 13 & 12 & 11 & 10 & 12 & 11 & 10 & 9 & 12 & 11 & 10 & 9 & 12 & 11 & 10 & 9 \\ 9 & 8 & 7 & 6 & 8 & 7 & 6 & 5 & 8 & 7 & 6 & 5 & 8 & 7 & 6 & 5 \\ 5 & 4 & 3 & 2 & 4 & 3 & 2 & 1 & 4 & 3 & 2 & 1 & 4 & 3 & 2 & 1 \end{pmatrix}$$

It can be seen that the top left element for the first bin (bin 0) now contains the digit '1' which indicates that the bin contains one entry. This is the bin count data referred to above and is updated each time a particle is added due to the incrementing of the values within the stencil buffer (block 206). The process is then repeated, with for example, the second particle being allocated to the fourth bin giving, the following in the framebuffer and stencil buffer respectively:

$$\begin{pmatrix} 1 & 0 & 0 & 0 & 0 & 0 & 0 & 0 & 0 & 0 & 0 & 2 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

$$\begin{pmatrix} 1 & 0 & 15 & 14 & 0 & 15 & 14 & 13 & 0 & 15 & 14 & 13 & 1 & 0 & 15 & 14 \\ 13 & 12 & 11 & 10 & 12 & 11 & 10 & 9 & 12 & 11 & 10 & 9 & 13 & 12 & 11 & 10 \\ 9 & 8 & 7 & 6 & 8 & 7 & 6 & 5 & 8 & 7 & 6 & 5 & 9 & 8 & 7 & 6 \\ 5 & 4 & 3 & 2 & 4 & 3 & 2 & 1 & 4 & 3 & 2 & 1 & 5 & 4 & 3 & 2 \end{pmatrix}$$

If the third, fourth and fifth particles are then allocated to the second bin, the resultant data in the frame and stencil buffers respectively will be:

$$\begin{pmatrix} 1 & 0 & 0 & 0 & 3 & 4 & 5 & 0 & 0 & 0 & 0 & 2 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

$$\begin{pmatrix} 1 & 0 & 15 & 14 & 3 & 2 & 1 & 0 & 0 & 15 & 14 & 13 & 1 & 0 & 15 & 14 \\ 13 & 12 & 11 & 10 & 15 & 14 & 13 & 12 & 12 & 11 & 10 & 9 & 13 & 12 & 11 & 10 \\ 9 & 8 & 7 & 6 & 11 & 10 & 9 & 8 & 8 & 7 & 6 & 5 & 9 & 8 & 7 & 6 \\ 5 & 4 & 3 & 2 & 7 & 6 & 5 & 4 & 4 & 3 & 2 & 1 & 5 & 4 & 3 & 2 \end{pmatrix}$$

And if particles 6-20 are allocated to the third bin, the resultant data in the frame and stencil buffers respectively will be:

$$\begin{pmatrix} 1 & 0 & 0 & 0 & 3 & 4 & 5 & 0 & 6 & 7 & 8 & 9 & 2 & 0 & 0 & 0 \\ 0 & 0 & 0 & 0 & 0 & 0 & 0 & 0 & 10 & 11 & 12 & 13 & 0 & 0 & 0 & 0 \\ 0 & 0 & 0 & 0 & 0 & 0 & 0 & 0 & 14 & 15 & 16 & 17 & 0 & 0 & 0 & 0 \\ 0 & 0 & 0 & 0 & 0 & 0 & 0 & 0 & 18 & 19 & 20 & 0 & 0 & 0 & 0 & 0 \end{pmatrix}$$

$$\begin{pmatrix} 1 & 0 & 15 & 14 & 3 & 2 & 1 & 0 & 15 & 14 & 13 & 12 & 1 & 0 & 15 & 14 \\ 13 & 12 & 11 & 10 & 15 & 14 & 13 & 12 & 11 & 10 & 9 & 8 & 13 & 12 & 11 & 10 \\ 9 & 8 & 7 & 6 & 11 & 10 & 9 & 8 & 7 & 6 & 5 & 4 & 9 & 8 & 7 & 6 \\ 5 & 4 & 3 & 2 & 7 & 6 & 5 & 4 & 3 & 2 & 1 & 0 & 5 & 4 & 3 & 2 \end{pmatrix}$$

By reading the top left values for each bin in the stencil buffer, it is apparent that the first bin (bin 0) contains 1 particle, the second bin (bin 1) contains 3 particles, the third bin (bin 2) contains 15 particles and the fourth bin (bin 3) contains 1 particle. The third bin (bin 2) is therefore full because it contains W×H−1 particles. The situation where the bin is overfilled is described below. At the end of the process, the stencil buffer data is written to a texture, C, which therefore contains bin count information and the frame buffer data is written to a texture I, which therefore contains the particle ID data (block 209).

Figure 5:
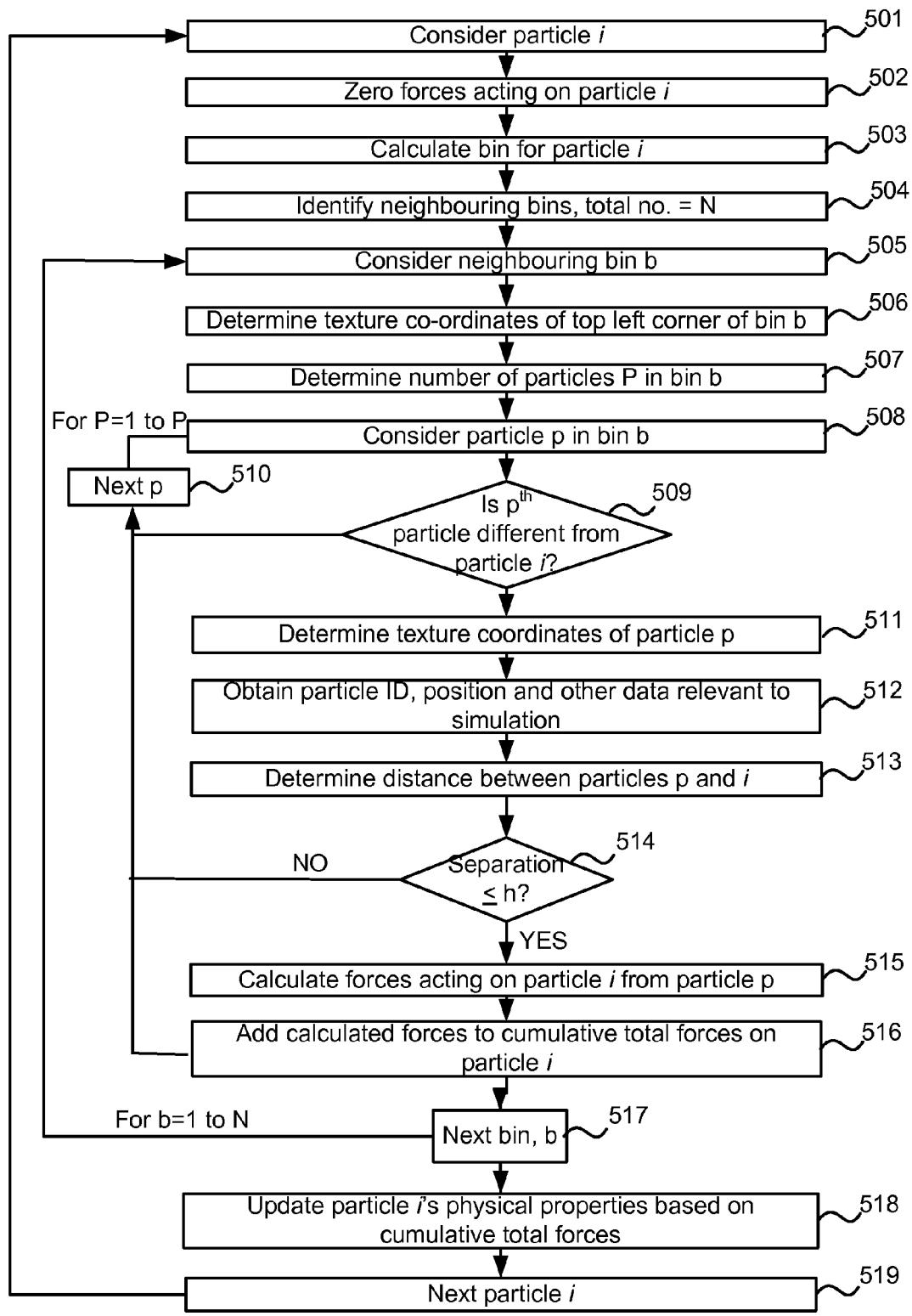
FIG. 5 shows an example flow diagram of a method of performing a nearest neighbor search.

The data generated as described above (e.g. according to the method shown in FIG. 2) can be used in performing advanced particle simulation, this simulation involves doing a nearest neighbor search as shown in FIG. 5. The nearest neighbor search is performed in two phases, a broad phase (blocks 501-504) in which the neighboring bins are identified and a narrow phase (blocks 505-514) in which particles in those neighboring bins are checked to determine whether the particle separation is greater than the support radius, h.

A first particle, i, is considered (block 501) and the forces on this particle are set to zero (block 502). The bin in which that particle i is located is calculated (block 503) based on the particle's position, e.g. using the mapping equations described above to calculate u and v (in relation to block 202). As described above, the particle's position data (co-ordinates x,y,z) may be stored and read from the vertex buffer 407, a texture (although texture-based position often has poorer resolution, and may, in some examples, therefore only be used for the read the positions of the neighbors, e.g. in block 511) or other memory.

From the identified bin, the candidate bins are identified (block 504). These are the bins which comprise the identified bins and those neighboring the identified bin (i.e. in general 9 bins in 2D or 27 bins in 3D, but less for corner/edge bins). The total number of candidate bins is denoted N. A first, bin b, of these candidate bins is considered (block 505) and the texture co-ordinates of the top left corner of bin b are determined (block 506), for example using:

Given a particle having co-ordinates (x,y,z):
Bin co-ordinates (x',y'z') are given by:

$$x'=\text{floor}(x/h)$$

$$y'=\text{floor}(y/h)$$

$$z'=\text{floor}(z/h)$$

The bin's texture co-ordinates are then given by:

$$u=(x'+E) \cdot W$$

$$v=y' \cdot H$$

The bin co-ordinates may already be known, in which case, only the mapping to texture space using the last two equations above may be required. Using this texture co-ordinate, the number of particles, P, in bin b can be identified (block 507) by reading the value from texture C at the determined texture co-ordinate. In the example above, for the second bin (bin 1) this value would be 3.

A loop (blocks 508-516) is then iterated for each particle in that bin (i.e. for p=1 to P) except where particle p being considered is actually particle i (as determined in block 509, which results in consideration of another particle (block 510)). In each iteration, the texture co-ordinate of a particle (the $p^{th}$ particle) is determined (block 511) and this co-ordinate is accessed in the particle ID texture I (i.e. the texture which stores the values that originated from the framebuffer) to obtain the particle ID for that $p^{th}$ particle in the bin (block 512) along with position data and any other data which is relevant to the particle simulation being performed. The texture co-ordinate of the $p^{th}$ particle may be determined according to:

$$s=\text{frac}((p/W)+(\tfrac{1}{2}W)) \times W$$

$$t=\text{floor}((p/W)+(\tfrac{1}{2}W))$$

Texture co-ordinate: (u+s, v+t)

where u and v are the bin's texture co-ordinates and may be determined using the equations given above and frac(x) provides the fractional result of x. Based on this position data, the distance between particles p and i is calculated (block 513) and for each particle where the separation is less than or equal to the support radius, h, (determined in block 514), the forces acting on particle i as a result of particle p are computed (block 515). The forces computed (in block 515) are then added to the cumulative total forces on particle i (block 516). The forces on particle i were initially set to zero (in block 502) and these forces are then added to (in block 516) for each iteration where the particle is closer than the support radius.

The position data (e.g. co-ordinates) of particle p may be accessed (in block 512) based on the particle ID (also determined in block 512) for example by reading these values from a texture or from the vertex buffer (which provides higher resolution data at the expense of more memory bandwidth).

In this loop (blocks 508-516) no forces are computed for the neighbor or candidate particle p found by the search. These forces are calculated separately when this particle itself becomes the particle under consideration (particle i in block 501).

Having considered all the particles in the first neighboring bin, the next bin is selected (block 517) process (blocks 505-516) is repeated until all N neighboring bins have been considered. Once all neighboring bins have been considered, the particle's (i.e. particle i's) physical properties can be updated (block 518) based on the calculated cumulative forces (from block 516). Having calculated the nearest neighbors of a first particle, another particle may be considered (block 519) and the process repeated (blocks 501-518) for other particles in the simulation. The simulation iterates through particles according to their particle ID (from a particle ID of zero in order of increasing particle ID).

Whilst the flow diagram in FIG. 5 shows a particular order of method steps and arrangement of loops, it will be appreciated that the method may be performed in a different order and loop backs may be implemented differently. Furthermore many of the steps may be performed substantially simultaneously.

As described above, the limit to the number of particles in a bin is given by W×H−1. If the limit is exceeded then data within the bin will be overwritten because the bin can only contain W×H−1 particle IDs and therefore particles which are nearest neighbors will be missed leading to a reduction in the accuracy of the simulation. This can be demonstrated with reference to the matrix examples given above. If an additional two particles, 21 and 22 are added to the third bin (which was already full as it contained 15 particles), the resulting framebuffer would comprise:

$$\begin{pmatrix} 1 & 0 & 0 & 0 & 3 & 4 & 5 & 0 & 22 & 7 & 8 & 9 & 2 & 0 & 0 & 0 \\ 0 & 0 & 0 & 0 & 0 & 0 & 0 & 0 & 10 & 11 & 12 & 13 & 0 & 0 & 0 & 0 \\ 0 & 0 & 0 & 0 & 0 & 0 & 0 & 0 & 14 & 15 & 16 & 17 & 0 & 0 & 0 & 0 \\ 0 & 0 & 0 & 0 & 0 & 0 & 0 & 0 & 18 & 19 & 20 & 21 & 0 & 0 & 0 & 0 \end{pmatrix}$$

where the particle ID for the $17^{th}$ particle in the third bin has overwritten the $1^{st}$ particle ID stored in the bin. The stencil buffer will also be updated to comprise:

$$\begin{pmatrix} 1 & 0 & 15 & 14 & 3 & 2 & 1 & 0 & \textcircled{1} & 0 & 15 & 14 & 1 & 0 & 15 & 14 \\ 13 & 12 & 11 & 10 & 15 & 14 & 13 & 12 & 13 & 12 & 11 & 10 & 13 & 12 & 11 & 10 \\ 9 & 8 & 7 & 6 & 11 & 10 & 9 & 8 & 9 & 8 & 7 & 6 & 5 & 8 & 7 & 6 \\ 5 & 4 & 3 & 2 & 7 & 6 & 5 & 4 & 5 & 4 & 3 & 2 & 5 & 4 & 3 & 2 \end{pmatrix}$$

where each element relating to the third bin has been incremented by two and therefore the value in the top left corner (ringed above) for the third bin, has increased from 15 to 1 (with the stencil buffer operating in "wrap" mode, as described above).

When this data is subsequently used for particle simulation which involves a nearest neighbor search, as shown in FIG. 5, the determination of how many particles there are in the third bin (in block 507) gives the result of P=1. Therefore the loop (blocks 508-516) is only performed once and only one particle ID is obtained (in block 512), which is particle ID 22. Particle ID 6 has had its data overwritten whilst particles with IDs of 7-21 have their data skipped because the method is unaware that there is data available (P=1, therefore the method only performs one loop).

Another Exemplary Method

Figure 6:
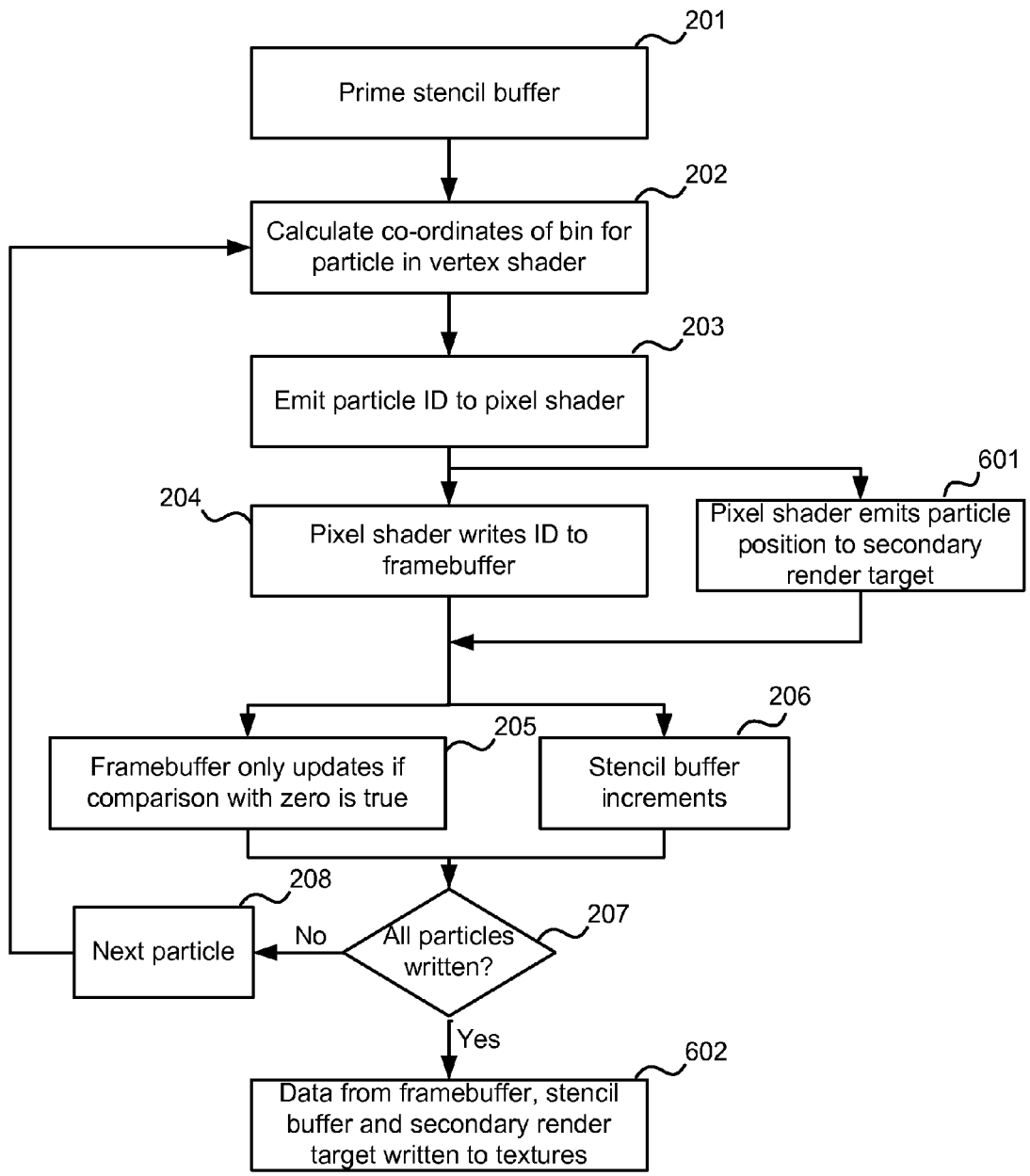
FIG. 6 shows a second example flow diagram of a method of spatial binning of particles which can be implemented on a GPU.

The method described above with relation to FIGS. 2-5 may be modified as shown in FIG. 6. The pixel shader 404 may be modified such that in addition to emitting the particle ID to the framebuffer 405 (block 204), also referred to as a primary render target, the pixel shader emits the position co-ordinates (x,y,z) to a secondary render target (block 601) within the framebuffer. When all the particles have been written ('yes' in block 207), the data from the secondary render target, in addition to the data from the stencil and framebuffers, is written to textures (block 602). For example, the position co-ordinate data may be written to a third texture, X.

Figure 7:
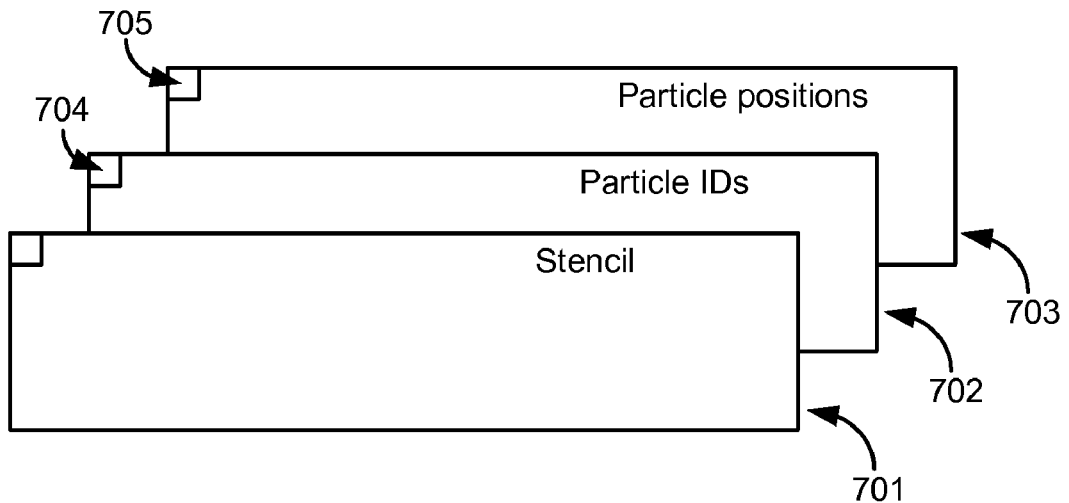
FIG. 7 shows a graphical representation of the data stored according to the method of FIG. 6.

A graphical representation of the data stored in the buffers/render targets is shown in FIG. 7. FIG. 7 shows the stencil buffer 701, framebuffer 702 containing particle IDs and secondary render target 703 (which may also be within the framebuffer) containing particle positions. If a position 704 in the framebuffer contains a particle ID, the corresponding position 705 in the secondary render target contains the position data for that particle. In other examples, alternative particle information (e.g. velocity, mass etc) may be stored in the secondary render target in addition to (or instead of) the particle position data. Similarly, when the data has been written to textures (block 602), corresponding positions in the texture I and the texture X may store the particle ID and position co-ordinates respectively for a particular particle.

When a search query is subsequently made (e.g. as shown in FIG. 5), a particle's position can be fetched (e.g. in blocks 503, 511 and/or 512) from the texture simultaneously with (or in some examples, instead of) the particle ID from the texture storing the data from the framebuffer. This enables the data to be fetched in a cache coherent manner so that the simulation can proceed efficiently.

A Further Exemplary Method

A further optimization may be used in combination with any of the methods described above (e.g. in combination with the method of FIG. 2 or FIG. 6) which ensures that particles are iterated over in an order corresponding to the bin in which they belong, rather than according to particle ID. This ensures cache coherency and improves performance significantly (e.g. by one or more orders of magnitude). This improvement in performance is obtained because when determining the neighbors of a first particle in a bin (as in FIG. 5) and then determining the neighbors of a second particle in the same bin (again as in FIG. 5) the same neighboring bins and candidate particles will be considered (in blocks 505 and 508 and their associated loops, blocks 505-517 and 508-516) and the same co-ordinate data will be required (accessed in block 512) to determine the separation of particle p and particle i (in block 513) and to calculate the forces on particle p (in block 515). Without the indirection table, the particles considered in sequence may be very far apart (e.g. the particle having ID=0 may be located in a distant bin from the particle having ID=1).

Figure 8:
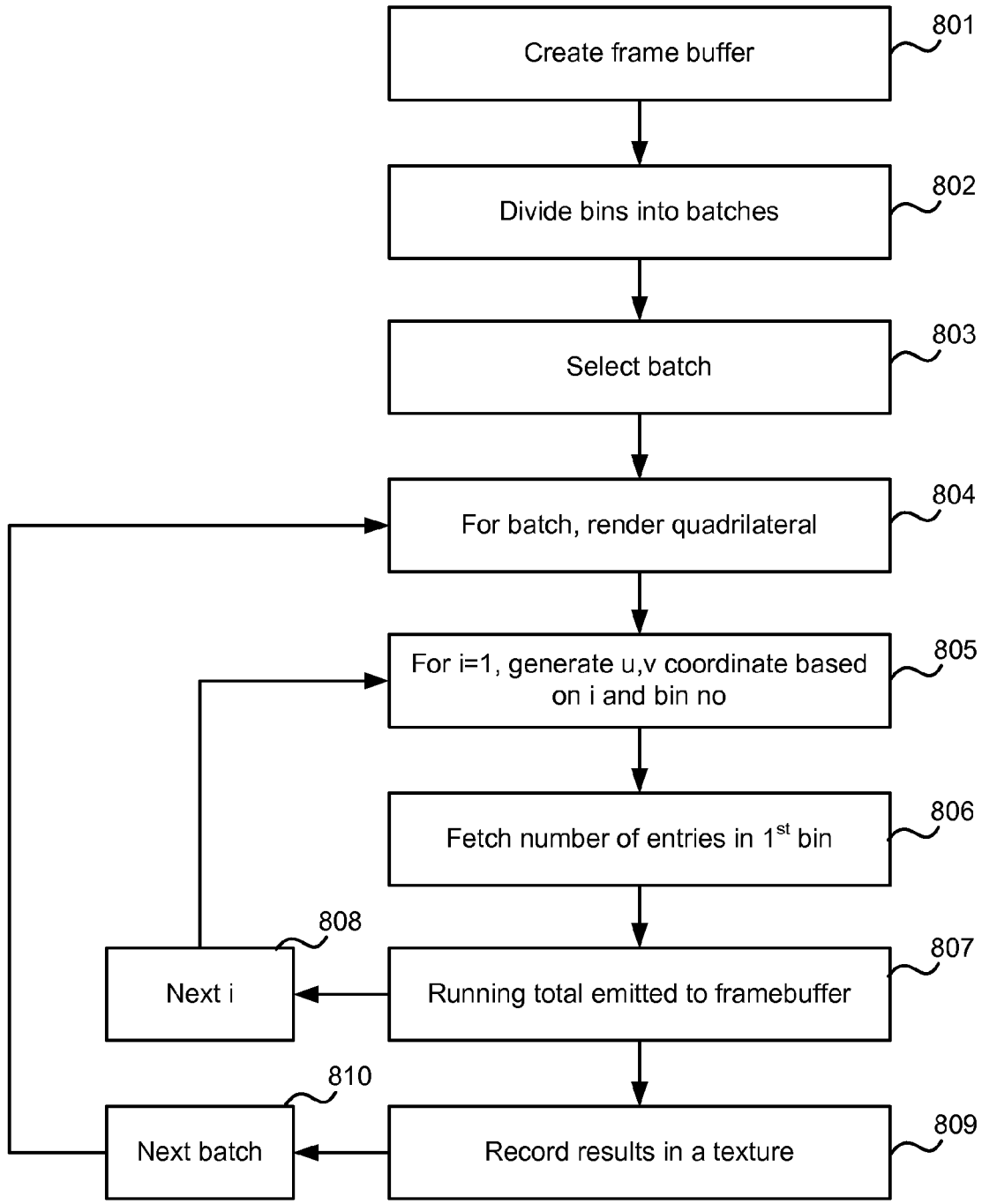
FIGS. 8 and 10 show example flow diagrams of a method of generating an indirection table.
Figure 9:
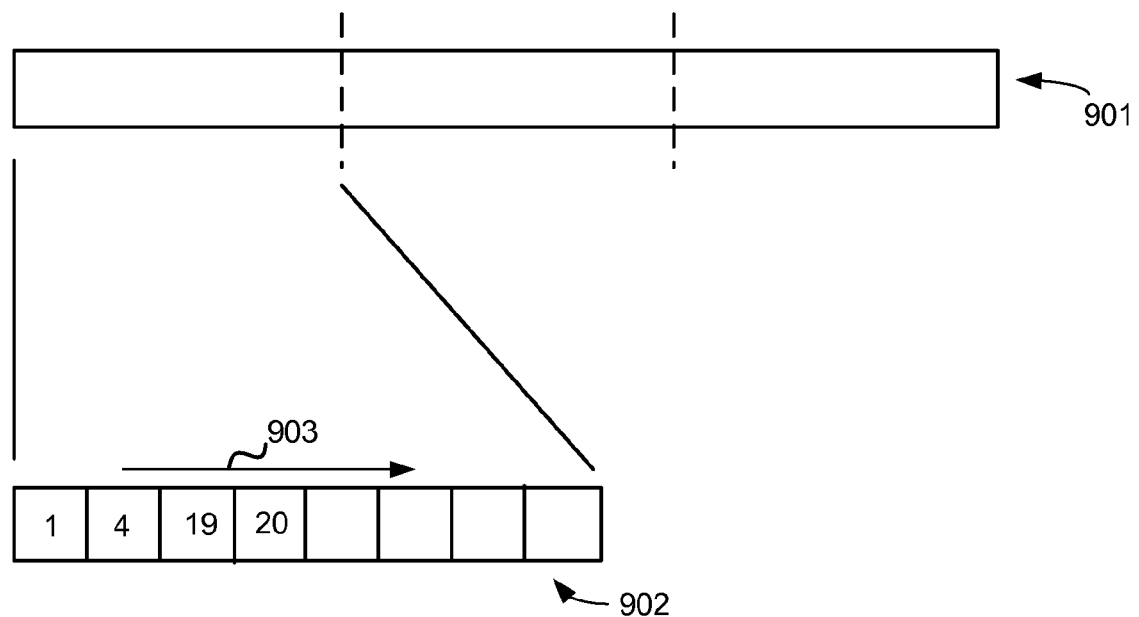
FIGS. 9 and 11 show graphical representations of the data at various stages within the methods shown in FIGS. 8 and 10.
Figure 10:
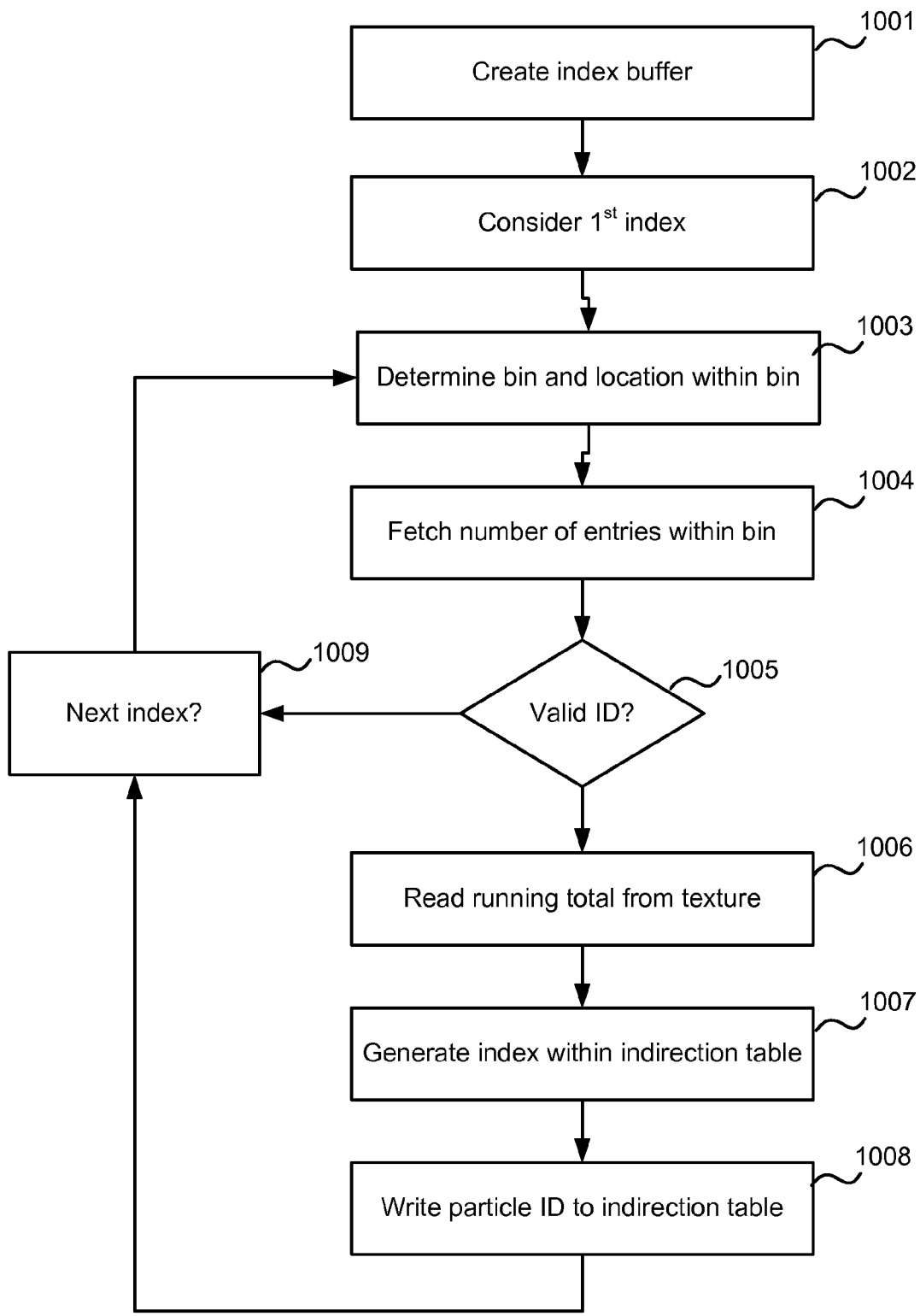
Figure 11:
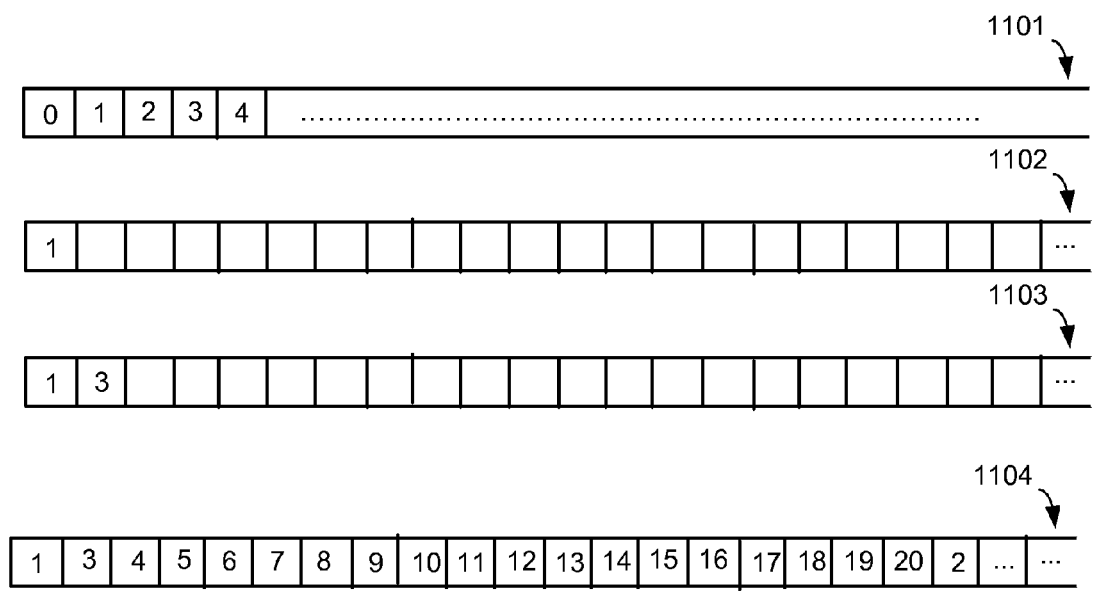

This optimization may be described with reference to FIGS. 8-11. FIGS. 8 and 10 show example flow diagrams of the method whilst FIGS. 9 and 11 show graphical representations of the data at various stages within the methods described.

A framebuffer 901 is created (block 801) which has a horizontal dimension which corresponds to the total number of bins B and with a vertical dimension which is small (e.g. as small as the hardware allows, as a minimum of one pixel is required). The total number of bins B, is then divided into a small number of batches (block 802) e.g. by dividing B by an integer. In an example implementation, each batch may comprise 80 bins, although in the simple example shown in FIG. 9, each batch comprises 8 bins and 3 batches are shown. In some examples a single batch may be used and in some examples it may be beneficial to use as few batches as possible because of the granularity of communications between the CPU and GPU.

A first batch (selected in block 803) is rendered as a thin horizontal quadrilateral 902 to the framebuffer (block 804), its left co-ordinate being given by the index of the first bin in the batch and its right co-ordinate being given by the number of bins in the batch. A pixel shader then performs a loop (blocks 805-808) with lower bound being 0 and upper bound being one less than the number of the pixel in the batch (counting to the right from the left hand side of the quad, as indicated by arrow 903). For each iteration, i, a (u,v) co-ordinate is generated based on the left-most bin index in the batch, B (a one dimensional value) and i (block 805). For example using:

$$u=\text{floor}(\text{Frac}((B+i+0.5)/(E*E))*E*E)*W$$

$$v=\text{floor}((B+i+0.5)/(E*E))*H$$

This (u,v) co-ordinate is used to fetch the number of entries of each bin in the batch (block 806) from the texture C containing the data from the stencil buffer (created as described above in blocks 209, 602). A running total of the number of entries in the current bin and those bins with lower indices within the same batch is calculated and in the case of the first batch, this value is emitted to the framebuffer (block 807) and at the end of each batch the results are written to a texture T (block 808). The process is then repeated for subsequent batches (blocks 810, 804-809) however, in block 807, the running total is summed with the results from the rightmost bin in the previous batch, such that the running total emitted to the framebuffer (in block 807) is actually the running total of the number of entries in the current bin and those bins with lower indices within the same batch and any previous batches. This data, which is stored in a texture T, is used in creating an indirection table, as shown in the example flow diagram of FIG. 10 and described below.

This method of FIG. 8 can be described with reference to the example given above in which the framebuffer and stencil buffers respectively are:

$$\begin{pmatrix} 1 & 0 & 0 & 0 & 3 & 4 & 5 & 0 & 6 & 7 & 8 & 9 & 2 & 0 & 0 & 0 \\ 0 & 0 & 0 & 0 & 0 & 0 & 0 & 0 & 10 & 11 & 12 & 13 & 0 & 0 & 0 & 0 \\ 0 & 0 & 0 & 0 & 0 & 0 & 0 & 0 & 14 & 15 & 16 & 17 & 0 & 0 & 0 & 0 \\ 0 & 0 & 0 & 0 & 0 & 0 & 0 & 0 & 18 & 19 & 20 & 0 & 0 & 0 & 0 & 0 \end{pmatrix}$$

$$\begin{pmatrix} 1 & 0 & 15 & 14 & 3 & 2 & 1 & 0 & 15 & 14 & 13 & 12 & 1 & 0 & 15 & 14 \\ 13 & 12 & 11 & 10 & 15 & 14 & 13 & 12 & 11 & 10 & 9 & 8 & 13 & 12 & 11 & 10 \\ 9 & 8 & 7 & 6 & 11 & 10 & 9 & 8 & 7 & 6 & 5 & 4 & 9 & 8 & 7 & 6 \\ 5 & 4 & 3 & 2 & 7 & 6 & 5 & 4 & 3 & 2 & 1 & 0 & 5 & 4 & 3 & 2 \end{pmatrix}$$

In block 805, for i=0 and the lowest bin in the batch being bin 0, a (u,v) co-ordinate is generated for the top left value in the stencil buffer data. This enables the value '1' to be fetched (block 806) and this value is emitted to the framebuffer (as shown in FIG. 9). In the next iteration, i=1 and the value '3' is fetched and therefore the running total of 4 is emitted to the framebuffer. In the third and fourth iterations the values of 15 and 1 are fetched respectively, leading to the values 19 and 20 being emitted to the framebuffer (as shown in FIG. 9).

An index buffer 1101 (element 406 in FIG. 4) is created (block 1001) which contains W×H×E³ indices, where the indices increase by one each time. Each index therefore corresponds to a potential location in a bin. This buffer is submitted to a vertex shader program which operates as shown in FIG. 10 (blocks 1002-1009). Considering a first index in the index buffer (block 1002), the corresponding bin number and location within a bin are determined (block 1003), for example using the following equations:

$$Bin=floor((Index+0.5)/(W\times H))$$

$$Location\ within\ bin=floor((frac((Index+0.5)/(W\times H)))\times W\times H)$$

The location within the bin may also be referred to as the in-bin index, I, and 0 represents the first entry in the bin. A (u,v) co-ordinate for the bin is calculated For example using:

$$u=floor(Frac((Bin+0.5)/(E*E))*E*E)*W$$

$$v=floor((Bin+0.5)/(E*E))*H$$

Using these co-ordinates the number of entries (i.e. particles) within the bin is fetched (block 1004). If the in-bin index is less than the number of entries in the bin, then the current vertex corresponds to a valid particle ID (determined in block 1005). In this case, a running total for the bin is read from texture T (block 1006) where texture T was created in block 809 as described above and this is used to generate an index within the indirection table (block 1007) by summing the in-bin index and the running total and subtracting the number of entries in the indicated bin (which may also be considered as the in-bin index, plus the running total for all the preceding bins, excluding the indicated bin). The particle ID is fetched from the texture I containing the data stored from the framebuffer earlier (in block 209, 602) using the second texture co-ordinate pair (u+s, v+t), as described above, which may be calculated using the equations for u and v given above and the following:

$$s=frac((I/W)+(\tfrac{1}{2}W))\times W$$

$$t=floor((I/W)+(\tfrac{1}{2}W))$$

where I is the in-bin index (or location within bin) described above. and then the particle ID is written to the indicated position (i.e. given by the index calculated in block 1007) in the indirection table (block 1008). The process may then be repeated (blocks 1009, 1003-1008) for the next index in the index buffer. The indirection table may be created (in block 1008) in the vertex buffer and subsequently held there. In another example, the position in the indirection table (generated in block 1007) may be converted to a screen co-ordinate and the particle index emitted, via a pixel shader, to a framebuffer whose results are subsequently saved as an indirection texture D (not shown in FIG. 10).

The method of FIG. 10 can be described with reference to the example used above and shown in FIG. 9. Considering the first index, 0, from the index buffer 1101 the bin and in-bin index are determined to be 0 and 0 respectively (block 1003). The number of entries within bin 0 is fetched (block 1004) and the value is 1 (see stencil buffer matrix above). As 0<1, the in-bin index corresponds to a valid particle ID (block 1005), the running total is read from texture T 903, which for bin 0 is 1 (block 1006). The index within the indirection table is generated (in block 1007) from the in-bin index (0) plus the running total (1) minus the number of entries in bin (0), giving an index of zero. The particle ID (in this case particle ID=1, from the example given above) is then written to position 0 in the indirection table (1008). FIG. 11 shows the contents of the indirection table 1102 at this point.

The process may then be repeated by considering the second index, 1, from the index buffer 1102. The bin and in-bin index are determined to be 0 and 1 respectively. The number of entries within bin 0 is fetched and found to be 1 and as 1 is not less than 1, the in-bin index does not correspond to a valid particle ID and therefore the method considers the next index (block 1009). In the example given, the same will be true for indices 2-15.

On considering index 16, the bin and in-bin index are determined to be 1 and 0 respectively. The number of entries in bin 1 is fetched and is 3. As 0<3, the in-bin index corresponds to a valid particle ID and the running total is read from texture T 903, which for bin 1 is 4. The index within the indirection table is generated from the in-bin index (0) plus the running total (4) minus the number of entries in bin (3), giving an index of one. The particle ID (in this case particle ID=3) is then written to position 1 in the indirection table (as shown in FIG. 11, 1103). If the process is then repeated for further indices, the indirection table will, for the example given above, be as shown in FIG. 11, 1104.

When using an indirection table, the search proceeds as shown in FIG. 5, however the particles are selected (in block 501) in sequence from the indirection table.

Whilst particular memory locations (i.e. textures/buffers) have been identified in this further optimization, this is by way of example only and any other suitable memory location may be used.

The writing of the indirection table in a vertex buffer may be implemented on an Xbox360 (trade mark) games console using the feature "memexport". Alternatively, it may be implemented on a PC having a DirectX 10 enabled GPU card.

Exemplary Computing-Based Device

Figure 12:
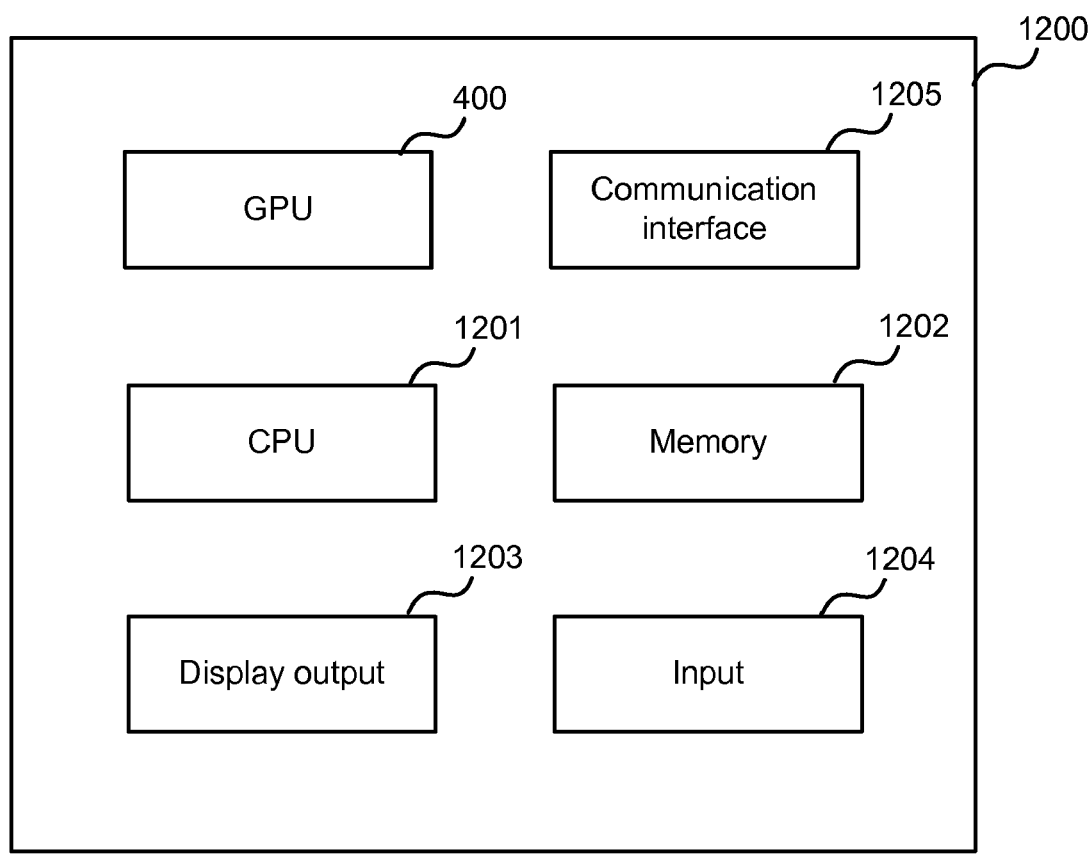
FIG. 12 illustrates an exemplary computing-based device in which embodiments of the methods described herein may be implemented.

FIG. 12 illustrates various components of an exemplary computing-based device 1200 which may be implemented as any form of a computing and/or electronic device, including but not limited to PCs and games consoles, and in which embodiments of the methods described above may be implemented.

The computing-based device 1200 comprises a GPU 400, for example as described above and may comprise one or more additional processors, such as CPU 1201. The additional processors may be microprocessors, controllers or any other suitable type of processors for processing computing executable instructions to control the operation of the device 1200.

The computer executable instructions may be provided using any computer-readable media, such as memory 1202. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1203 is also provided such as an audio and/or video output to a display system integral with or in communication with the computing-based device. The display system may provide a graphical user interface, or other user interface of any suitable type although this is not essential.

The computing-based device 1200 may also comprises one or more inputs 1204 which are of any suitable type for receiving media content, Internet Protocol (IP) input etc. The device may also comprise a communication interface 1205.

Conclusion

In the above examples, the length of the volume on a side over which the simulation is to take place, L, and the number of bins along an edge of the simulation, E, is the same in all three dimensions (as shown in FIG. 3). This is by way of example only and in many examples the values of L and E may be different for different dimensions and the equations shown above would be modified accordingly.

Whilst in the above examples, the pixel and vertex shaders are used for particular calculations, it will be appreciated that the calculations may swapped and performed in the other shader. Furthermore, should a GPU comprise alternative or additional programmable elements, these calculations may be performed in any such programmable element. It will also be appreciated that whilst particular textures/buffers have been used to store data, the data may alternatively be stored in different memory structures. Memory locations may be selected to optimize the fetching of the data (for this method or for methods using this data, e.g. as described above) and to minimize overload at any point in the GPU. In some examples, vertex shaders may write to vertex buffers and/or textures and pixel shaders may write to textures.

Although the present examples are described and illustrated herein as being implemented in a computing system as shown in FIG. 12, the system described is provided as an example and not a limitation. As those skilled in the art will appreciate, the present examples are suitable for application in a variety of different types of computing systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. The loops shown in the examples contained herein are by way of example only and alternative loop arrangements are also possible.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of spatial binning of particles comprising:
priming a stencil buffer with a repeating pattern of values;
in a first shader, calculating the co-ordinates of a bin for a first particle;
in said first shader, emitting an identifier of said first particle to a second shader;
in said second shader, writing said identifier to a framebuffer based on said co-ordinates;
updating an element in said framebuffer with said identifier if a comparison with a corresponding value in said stencil buffer satisfies specified criteria; and
incrementing each value in said stencil buffer which corresponds to said bin.

2. The method according to claim 1, further comprising:
repeating said calculating, emitting, writing, updating and incrementing steps for each of a plurality of particles.

3. The method according to claim 2, further comprising:
writing data from said framebuffer to a first texture; and
writing data from said stencil buffer to a second texture.

4. The method according to claim 1, wherein said first shader comprises a vertex shader.

5. The method according to claim 1, wherein said second shader comprises a pixel shader.

6. The method according to claim 1, further comprising:
in said second shader, emitting position data for said first particle to a secondary render target.

7. The method according to claim 6, further comprising:
writing data from said framebuffer to a first texture;
writing data from said stencil buffer to a second texture; and
writing data from said secondary render target to a third texture.

8. The method according to claim 1, further comprising:
creating a buffer having a horizontal dimension corresponding to a total number of bins;
dividing said bins into a plurality of batches;
for each batch:
rendering a quadrilateral according to a number of bins in said batch;

in said second shader, generating a co-ordinate for each bin in said batch, fetching a number of entries in each said bin using said co-ordinate, and for each bin, emitting a running total of entries to said framebuffer; and writing data in said framebuffer to a texture;

creating an index buffer; and for each index:
determining a corresponding bin and in-bin location;
fetching said number of entries in said corresponding bin; and
if said in-bin location is valid, reading said running total for said bin from said texture, generating an index, fetching a particle ID for said in-bin location and writing said particle ID to an indirection table.

9. One or more device-readable storage media with device-executable instructions that, when executed by a computing system, direct the computing system to perform steps comprising:

priming a stencil buffer with a repeating pattern of values;

in a first shader, calculating the co-ordinates of a bin for a first particle;

in said first shader, emitting an identifier of said first particle to a second shader;

in said second shader, writing said identifier to a framebuffer based on said co-ordinates;

updating an element in said framebuffer with said identifier if a comparison with a corresponding value in said stencil buffer satisfies specified criteria; and incrementing each value in said stencil buffer which corresponds to said bin.

10. A graphical processing unit comprising:
a stencil buffer;
a first shader;
a second shader;
a framebuffer; and
a plurality of textures,
wherein said first shader is arranged to:
calculate the co-ordinates of a bin for a first particle; and
emit an identifier of said first particle to said second shader;
wherein said second shader is arranged to:
write said identifier to said framebuffer based on said co-ordinates;
and wherein said graphical processing unit is arranged to:
cause an element in said framebuffer to be updated with said identifier if a comparison with a corresponding value in a repeating value stored in said stencil buffer satisfies specified criteria; and
increment each value in said stencil buffer which corresponds to said bin.

11. The graphical processing unit according to claim 10, wherein said first shader comprises a vertex shader.

12. The graphical processing unit according to claim 10, wherein said second shader comprises a pixel shader.

* * * * *